(12) United States Patent
Tjokro

(10) Patent No.: US 12,480,772 B2
(45) Date of Patent: Nov. 25, 2025

(54) ROUTING RECOMMENDATION SYSTEM BASED ON USER ACTIVITIES

(71) Applicant: GM CRUISE HOLDINGS LLC, San Francisco, CA (US)

(72) Inventor: Moorissa Tjokro, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 220 days.

(21) Appl. No.: 18/326,674

(22) Filed: May 31, 2023

(65) Prior Publication Data
US 2024/0401961 A1    Dec. 5, 2024

(51) Int. Cl.
*G01C 21/34* (2006.01)
*G01C 21/36* (2006.01)
(Continued)

(52) U.S. Cl.
CPC ..... *G01C 21/3484* (2013.01); *G01C 21/3617* (2013.01); *G06Q 10/02* (2013.01); *G06Q 50/40* (2024.01)

(58) Field of Classification Search
CPC ............ G01C 21/3484; G01C 21/3617; G06Q 50/04; G06Q 10/02; G06Q 50/14; G06F 10/9535; G06F 16/9536; G06F 9/9537
(Continued)

(56) References Cited

U.S. PATENT DOCUMENTS

| 8,407,099 B1 * | 3/2013 | Frank ................... G06Q 10/025 705/26.1 |
| 2013/0031506 A1 * | 1/2013 | Diaz ..................... G06Q 50/12 715/781 |

(Continued)

FOREIGN PATENT DOCUMENTS

| CN | 114528480 | * | 5/2022 | ......... G06F 16/2462 |

OTHER PUBLICATIONS

Rani et al, A Development of Travel Itinerary Planning Application using Traveling Salesman Problem and K-Means Clustering Approach, ICSCA '18 (Year: 2018).*

(Continued)

*Primary Examiner* — Michael P Harrington
*Assistant Examiner* — Mark C Clare
(74) *Attorney, Agent, or Firm* — CANTOR COLBURN LLP

(57) ABSTRACT

Disclosed are embodiments for facilitating a routing recommendation system based on user activities. In some aspects, an embodiment includes receiving input data comprising a list of activities requested by a user of an autonomous vehicle (AV) ride-hailing service and a point of destination requested by the user; mapping locations of interest corresponding to the list of activities; generating an ordered list of the locations of interest based on a user profile and historical data of the user; supplementing the ordered list of the locations of interest based on other historical data of other users of the AV ride-hailing service to generate a recommended list of places; applying a K-means clustering technique to the recommended list of places to identify one or more sets of recommendations and a centroid location for each set of recommendations; and providing a routing recommendation corresponding to a selected set of the sets of recommendations.

18 Claims, 8 Drawing Sheets

(51) Int. Cl.
*G06Q 10/02* (2012.01)
*G06Q 50/40* (2024.01)

(58) Field of Classification Search
USPC .............................................. 705/6
See application file for complete search history.

(56) References Cited

U.S. PATENT DOCUMENTS

| | | | |
|---|---|---|---|
| 2013/0345958 A1* | 12/2013 | Paek | G01C 21/3697 |
| | | | 701/400 |
| 2016/0055555 A1* | 2/2016 | Mills | G06Q 30/0609 |
| | | | 705/26.35 |
| 2017/0299402 A1* | 10/2017 | Hansen | H04W 4/024 |
| 2018/0025303 A1* | 1/2018 | Janz | G16H 50/20 |
| | | | 705/2 |
| 2022/0172259 A1* | 6/2022 | Pandit | G06Q 50/40 |
| 2022/0335513 A1* | 10/2022 | Thompson | G06Q 10/02 |
| 2023/0162300 A1* | 5/2023 | Bharti | G06N 5/01 |
| | | | 705/319 |

OTHER PUBLICATIONS

Zahra et al, Novel centroid selection approaches for KMeans-clustering based recommender systems, Information Sciences 320, pp. 156-189 (Year: 2015).*

* cited by examiner

400

Receive input data comprising a list of activities requested by a user of an autonomous vehicle (AV) ride-hailing service and a point of destination requested by the user
410

↓

Map locations of interest corresponding to the list of activities, where the locations of interest are within a geographic boundary of the point of destination
420

↓

Generate an ordered list of the locations of interest based on a profile of the user established with the AV ride-hailing service and historical data of the user with the AV ride-hailing service
430

↓

Supplement the ordered list of the locations of interest based on other historical data of other users of the AV ride-hailing service
440

↓

Apply K-means clustering to the recommended list of places to identify one or more sets of recommendations and to identify a centroid location for each set of recommendations
450

↓

Provide, to the user via an application of the AV ride-hailing service, a routing recommendation corresponding to a selected set of the sets of recommendations
460

Receive input data comprising a list of activities requested by a user of an autonomous vehicle (AV) ride-hailing service and a point of destination requested by the user
510

Provide, to the user via an application of the AV ride-hailing service, a routing recommendation comprising a location for each activity in the list of activities and a drop off location, where the routing recommendation is generated based on the input data, a profile of the user established for the AV ride-hailing service, historical data of the user with the AV ride-hailing service, and other historical data of other users with the AV ride-hailing service
520

Receive user confirmation of the routing recommendation
530

Provide, to the user via the application, activity recommendations of other activities that are available in a geographic boundary of the point of destination
540

Provide, to the user via the application, an itinerary confirmation confirming the routing recommendation and any other activity recommendations selected by the user
550

Receive user feedback with respect to the routing recommendation, the user feedback utilized to improve future routing recommendations
560

*FIG. 5*

ROUTING RECOMMENDATION SYSTEM BASED ON USER ACTIVITIES

BACKGROUND

1. Technical Field

The disclosure generally relates to the field of processing systems and, more specifically, to routing recommendation system based on user activities.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

BRIEF DESCRIPTION OF THE DRAWINGS

The various advantages and features of the disclosed technology will become apparent by reference to specific embodiments illustrated in the appended drawings. A person of ordinary skill in the art will understand that these drawings show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIG. 4 illustrates an example method implementing generating a routing recommendation based on user activities, in accordance with embodiments herein;

FIG. 5 illustrates an example method for implementing an overall process of a routing recommendation system based on user activities, in accordance with embodiments herein;

DETAILED DESCRIPTION

Figure 1:
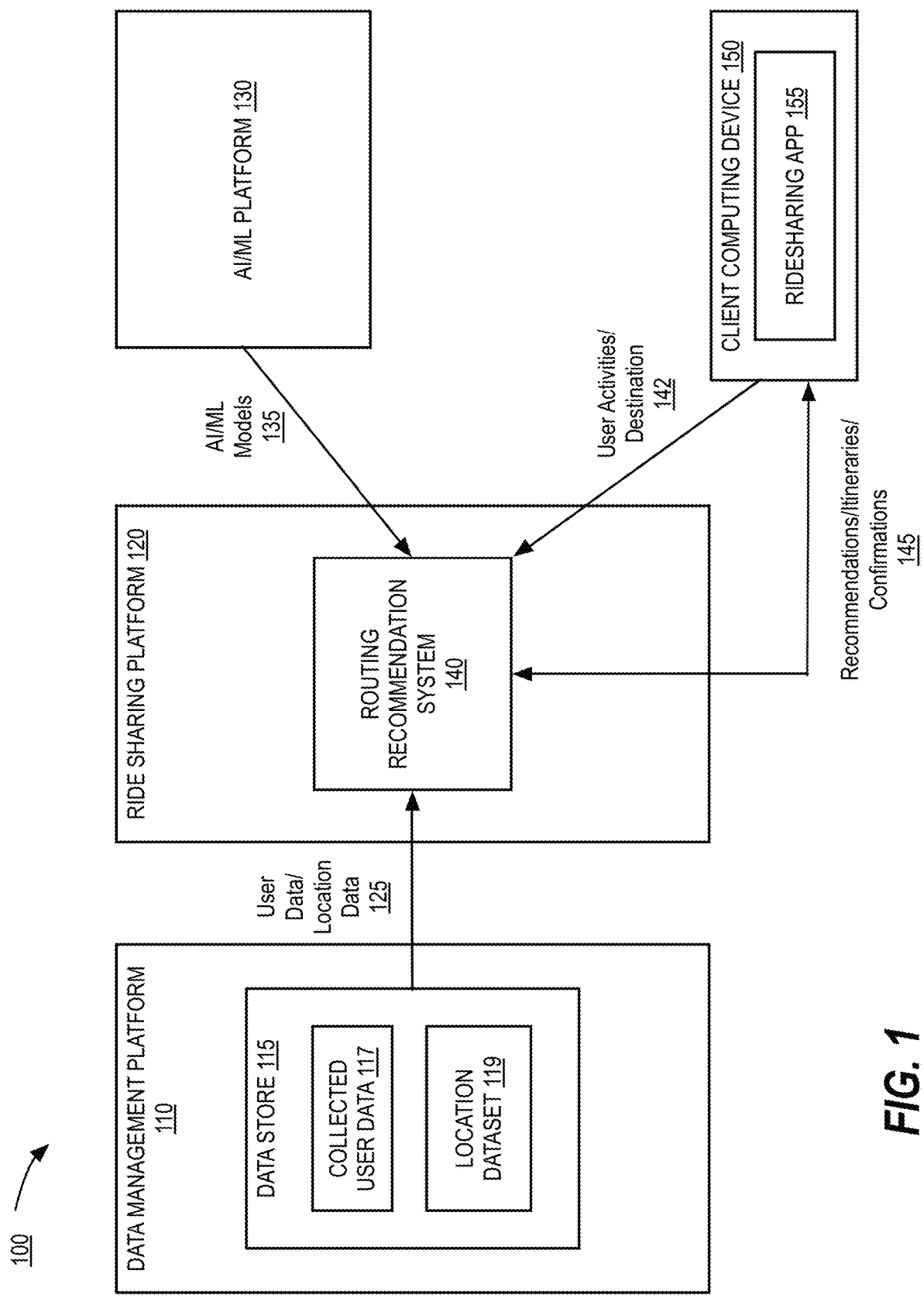
FIG. 1 is a block diagram of an example system illustrating a routing recommendation system based on user activities, in accordance with embodiments herein.

The detailed description set forth below is intended as a description of various configurations of the subject technology and is not intended to represent the configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs), also known as self-driving cars, driverless vehicles, and robotic vehicles, can be implemented by companies to provide self-driving car services for the public, such as taxi or ride-hailing (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

AVs can be implemented by companies to provide self-driving car services for the public, such as taxi or ride-hailing (i.e., ridesharing) services (also referred to herein as AV ride-hailing services or AV self-driving car services). The AV self-driving car services can increase transportation options and provide a flexible and convenient way to transport users between locations. To use an AV self-driving car service, a user may typically request a ride through an application provided by the AV self-driving car service. When requesting the ride, the user can define a specific pick-up or drop-off location, which the AV self-driving service can use to identify the route of the user and select a nearby AV that is able to provide the requested ride to the user. The self-driving car service can then deploy the AV to pick up and transport the user to the drop-off location. Upon reaching the drop-off location, the user can disembark the AV and continue to their final destination.

In some approaches of AV self-driving car services, the routing and drop-off experience of the user can be limited. The AV self-driving car service requests an exact address for users to travel to a particular destination. When more than one address is added, a single trip of multiple destinations would include multiple visits to sequential locations until a final destination is reached. This routing can work well for a use case such as picking up an item or another person, or for dropping off an item or person during the ordered trip. However, this AV ride-hailing approach is limited in that the routing is restricted, such as in sequential visits to multiple destinations. This may not work well for users who, for example, (1) want to spend an extended amount of time in different locations instead of going to all of the multiple locations in a single, sequential trip; (2) are interested in exploring multiple places but do not have an exact address to travel to; and/or (3) want to explore locations based on activities of interest.

Such use cases often arise with users that are traveling to a new city or users performing their weekend routine, for example. In the former case, for example, the user may plan to start the day in a café for breakfast followed by a visit to a popular sightseeing destination. In the latter case, for example, the user might have an idea of what they want to do and the neighborhood they are interested in exploring, but does not know the exact place to go. Some AV self-driving car services do not provide a solution for generating a route for a user that enables the user to explore a particular area based on planned user activities.

To address these noted technical problems and challenges, embodiments herein provide a routing recommendation system based on user activities. Embodiments herein enable a routing recommendation system based on user activities that allows a user to explore a particular area, such as a city or neighborhood, by determining a drop-off location at a preferred destination or at an optimal location closest to the user-indicated places of interest. The routing recommendation system of embodiments herein may receive a list of activities and a place of destination inputted by a user of a ridesharing app (e.g., of an AV ride-hailing service) at a client computing device. The routing recommendation system can utilize additional user data and/or location data to provide location recommendations for the list of activities, as well as an optimal location for drop-off of the user. The additional user data may include user preferences, user history with the ridesharing app, sensor detections corresponding to the user during their past trips, other user data of other users with similar interests, and so on. The location information may include ratings and reviews associated with the locations for the list of activities. A logical ordering of the activities may be utilized to identify the recommended locations as well as the recommended drop-off location. The user can confirm the location recommendations and drop-off location, and the routing recommendation system can then provide a routing confirmation and cause the AV to be dispatched for the user's trip.

Although some embodiments herein are described as operating in an AV, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. Furthermore, other embodiments may be more generally implemented in any artificial intelligence and/or machine learning-type environment. The following description discussed embodiments as implemented in an automotive environment, but one skilled in the art will appreciate that embodiments may be implemented in a variety of different environments and use cases. Further details of the routing recommendation system based on user activities of embodiments herein are further described below with respect to FIGS. 1-8.

FIG. 1 is a block diagram of an example system 100 illustrating a routing recommendation system based on user activities, in accordance with embodiments herein. In one embodiment, system 100 implements a ridesharing platform 120 for providing the routing recommendation system based on user activities, as described further herein. The system 100 of FIG. 1 can be, for example, part of a data center that is cloud-based or otherwise. In other examples, the system 100 can be part of an AV or a human-operated vehicle having an advanced driver assistance system (ADAS) that can utilize various sensors including camera, LIDAR, and RADAR sensors.

In one embodiment, system 100 can communicate over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In one embodiment, system 100 can be implemented using a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth.

The system 100 may be part of a data center for managing a fleet of AVs and AV-related services. The data center can send and receive various signals to and from an AV. These signals can include sensor data captured by the sensor systems of the AV, roadside assistance requests, software updates, ridesharing pick-up and drop-off instructions, and so forth. In some examples, the system 100 may be hosted in a data center that may also support a ridesharing service, a delivery service, a remote/roadside assistance service, street services (e.g., street mapping, street patrol, street cleaning, street metering, parking reservation, etc.), and the like. In some embodiments, the system 100 may be implemented in the AV itself or may be implemented in a server computing device.

In this example, the system 100 includes one or more of a data management platform 110, a ridesharing platform 120, and an Artificial Intelligence/Machine Learning (AI/ML) platform 130, among other systems.

Data management platform 110 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. In one embodiment, the data management platform includes a data store 115 that stores collected user data 117 collected, for example, from the user (e.g., as part of setting up a user profile) and/or from operation of one or more AVs. In some embodiments, data store 115 may also include a location dataset 119 that stores location data, such as geographic location, ratings, and reviews of various geographic locations. This location data be provided from any source, including third-party sources that maintain databases of information regarding different locations (e.g., restaurants, hotels, shops, parks, etc.).

In some embodiments, the ridesharing platform 120 is utilized to interact with ridesharing application(s) (app) 155 operating on client computing device(s) 150. Client computing device 150 can include, for example and without limitation, a smartphone, a tablet computer, a laptop computer, a head-mounted display (HMD), a gaming system, a server, a smart device, a smart wearable device (e.g., smart watch; smart eyeglasses or other Head-Mounted Display (HMD); smart car pods or other smart in-car, on-car, or over-ear device; etc.), and/or any other computing device. In some cases, the client computing device 150 can be a passenger or client computing device. The client computing device 150 can be a customer's mobile computing device or a computing device integrated with the AV.

The ridesharing platform 120 can receive requests from ridesharing app 155, such as user requests to be picked up or dropped off, and can dispatch an AV for a requested trip. The ridesharing platform 120 can also act as an intermediary between the ridesharing app 155 and the AV. For example, ridesharing platform 120 can receive, from a passenger, instructions for the AV, such as instructions to go around an obstacle, change routes, select a drop-off location, honk the horn, etc. The ridesharing platform 120 can provide such instructions to the AV as requested.

The AI/ML platform 130 can provide an infrastructure for training and evaluating machine learning algorithms for operating the AV, the ridesharing platform 120, and other platforms and systems. In one embodiment, the AI/ML platform 130 of system 100 may include a dataset generator, a model trainer, and/or a model deployer. Using the dataset generator, model trainer, and/or the model deployer, data scientists can prepare data sets from the data management platform 110; select, design, and train machine learning models 135; evaluate, refine, and deploy the models 135; maintain, monitor, and retrain the models 135; and so on.

In embodiments herein, the ridesharing platform 120 implements a routing recommendation system 140 based on user activities. The routing recommendation system 140 may receive a list of activities and a place of destination 142 inputted by a user of the ridesharing app 155 at client computing device 150. The routing recommendation system 140 can utilize user data and/or location data 125 to provide recommendations 145 of locations for the list of activities as well as an optimal location for drop-off of the user. The user data may include user preferences, user history with the ridesharing app 155, sensor detections corresponding to the user during their past trips, other user data of other users having similar interest as the user, and so on. The location information may include ratings and reviews associated with the locations for the list of activities. A logical ordering of the activities may be utilized to indicate the recommended locations for activities, as well as the recommended drop-off location. The user can confirm the recommendations 145 of the activity locations and drop-off location. Then, the routing recommendation system 140 can provide a routing confirmation and itinerary 145 and cause the AV to be dispatched for the user's trip.

Figure 2:
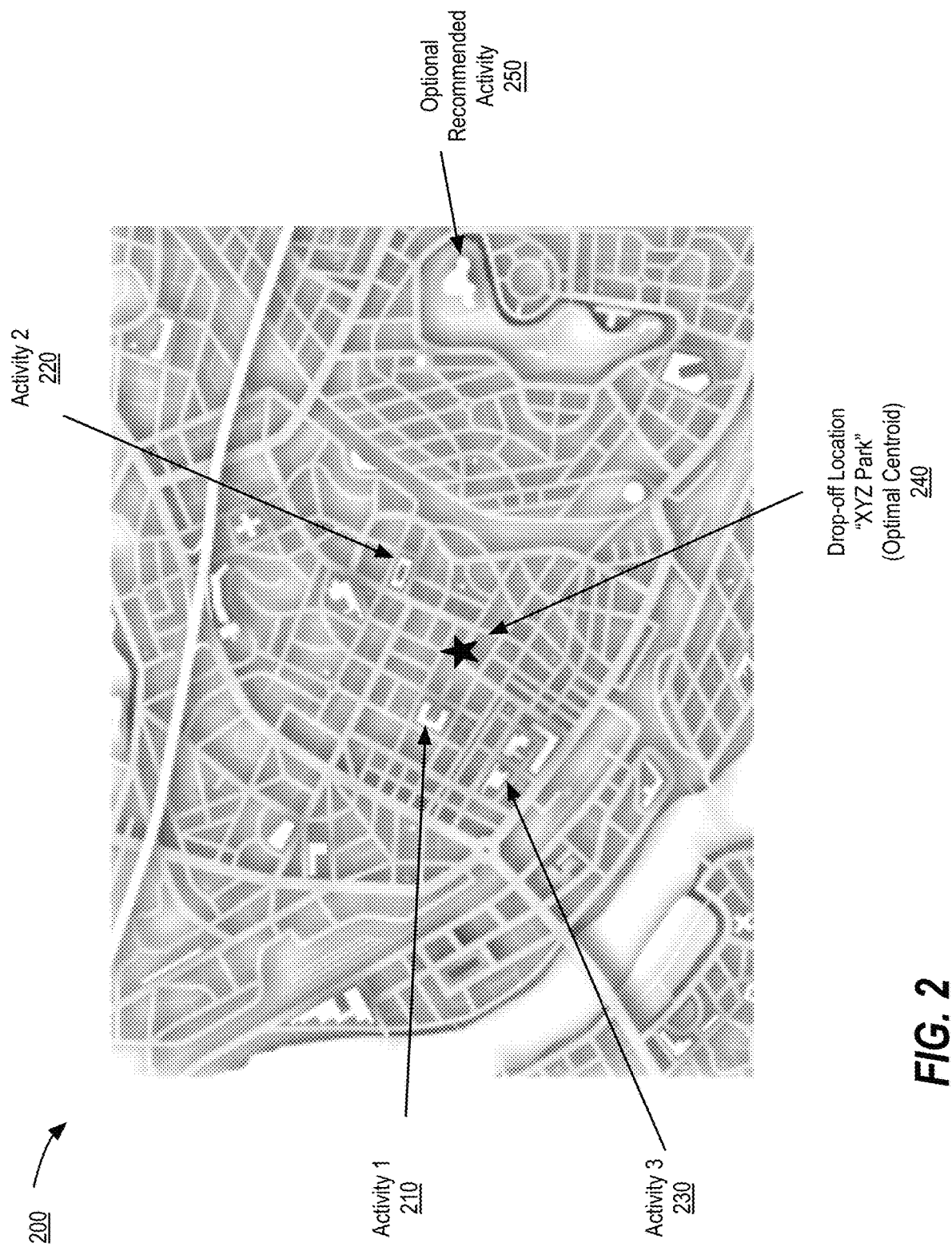
FIG. 2 is a map illustrating an example use case for a routing recommendation system based on user activities, in accordance with embodiments herein.

FIG. 2 is a map 200 illustrating an example use case for a routing recommendation system based on user activities, in accordance with embodiments herein. In one embodiment, the routing recommendation system 140 of FIG. 1 may be utilized for the example use case depicted in FIG. 2. In the example use case of FIG. 2, a user may seek to visit a particular neighborhood shown in map 200. The user may provide a destination and list of activities to a ridesharing platform having a routing recommendation system. For example, the user may provide (input), via a ridesharing app, a point of destination of "ABC Valley" and a list of activities of Activity 1: "Lunch", Activity 2: "Mani-pedi", and Activity 3: "Meet a friend at a café".

The routing recommendation system would then recommend to the user (via the ridesharing app) a list of recommended locations for activity 1 210, activity 2 220, and activity 3 230, as well as a drop-off location (i.e., optimal centroid) 240 where the user can be dropped off (e.g., XYZ Park in ABC Valley, as starred in the map 200). The user can then confirm this drop-off location 240 and activity locations 210-230, or select a different first stop closest to the recommended activity locations 210-230. Until the user confirms activity locations and drop-off location, the user may be presented with other options to select other recommendations of places based on their activity preferences. In some embodiments, the additional recommendations of places may be groups of locations/businesses corresponding to Activities 1-3 that are proximate in location and include a centralized drop-off location between each grouping of locations/businesses. In some embodiments, after the user confirms the activity locations 210-230 and the drop-off location 240, the routing recommendation system may also recommend other places of interest 250 based on the user's activity preferences. Further details of the routing recommendation process based on user activities is described below with respect to FIGS. 3-5.

Figure 3:
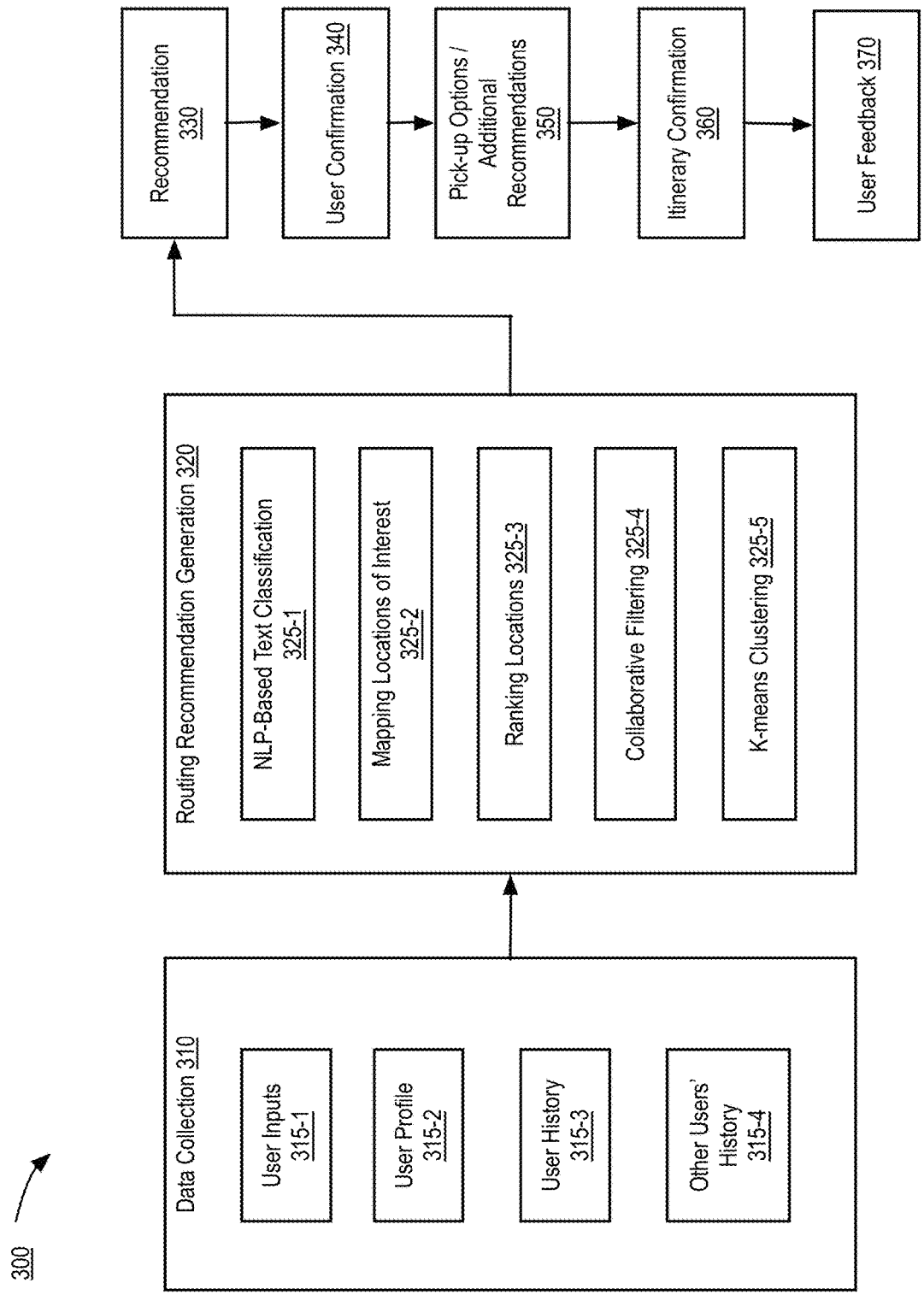
FIG. 3 is a workflow schematic of a routing recommendation system for generating routing recommendations based on user activities, in accordance with embodiments herein.

FIG. 3 is a workflow schematic of a routing recommendation system 300 for generating routing recommendations based on user activities, in accordance with embodiments herein. In one embodiment, routing recommendation system 300 is the same as routing recommendation system 140 described with respect to FIG. 1. In one embodiment, the example workflow of routing recommendation system 300 includes a process where, given N number of activity types and a place of destination inputted by a user, the routing recommendation system 300 can provide an optimal location recommendation for drop-off, as well as recommendation locations for the N activity types.

The example workflow of routing recommendation system 300 begins with data collection 310. The data collection 310 process provides input data for running the routing recommendation system of embodiments herein. The data collection 310 can collect data including, but not limited to, user inputs 315-1, user profile 315-2, user history 315-3, and/or other user history 315-4.

The user inputs 315-1 can include data inputted by the user using a ridesharing application (app) of an AV ride-hailing service. The user may provide the user inputs 315-1 as part of ordering a ride using the ridesharing app. The user inputs 315-1 may include a list of activities that can include one or more activities inputted in human free text form, for example. Some example activity types can include, but are not limited to: have lunch (or dinner, breakfast, snack, etc.), have Italian food, spa, running, biking etc. In some embodiments, the input argument of the user inputs 315-1 can be relaxed as a natural language processing (NLP) input or a fixed set of categories.

In embodiments herein, the user inputs 315-1 also include a point of destination (e.g., a geographic area, neighborhood, ZIP code, etc.) specified by the user. The point of destination can also be provided in a human free text form (e.g., relaxed as an NLP input, etc.). Example points of destination can be a specific address, a geographic area such as a neighborhood, ZIP code, etc., a city, and so on.

User inputs 315-1 may also include optional input data such as reviews and ratings. The reviews input data may indicate a number of reviews (e.g., 100 reviews) of a location, which can act as a filter for locations that are returned. In one embodiment, a default setting of the routing recommendation system may be zero (0) reviews. The ratings input data may indicate a level of rating (e.g., 3 stars, 4 stars, etc.) that can act as a filter for locations that are returned.

In one embodiment, the user input may be based on past drop-off and pick-up locations. For example, if the user previously requested a rider to a first business A (drop-off location) and then two hours later the user requests a ride back to the user's home but is now outside of business B. In this example, the system might infer that the user has a history of visiting business A (perhaps a coffee shop) and subsequently business B (perhaps a hair salon). As such, the system could infer that the user prefers getting a coffee after a haircut and utilizing this information for destination recommendations. Alternatively, the user may visit business B before visiting business A, and in the case the system may assume that the user prefers getting a coffee before a haircut.

In one embodiment, the user input 315-1 may also include an option to indicate an ordered activities preference. An ordered activities preference refers to whether the user wants to be dropped off at the location associated with the first activity of interest. If the ordered activities preference is set (on, selected, toggled on, etc.), then the user is to be dropped off at the location associated with the first activity of interest. If the ordered activities preference is not set (e.g., off, not selected, toggled off, etc.), then the user can be dropped off at the centroid of the recommended places associated with the activities of interest. In one embodiment, the ordered activities preference may be provided as a toggle on the user interface (UI) of the ridesharing app on which the user provides their input.

The user profile 315-2 may refer to a profile that is setup by the user. The user profile 315-2 may include information of the user such as, name, age, and other preferences such as activities of interest, food restrictions, past reviews, etc. In one embodiment, the user profile may be set up by the user when the user initially registers for the AV ride-hailing service using the ridesharing app.

The user history 315-3 may refer to historical data of the user obtained from the ridesharing app and/or from sensors of the AV. In one embodiment, the historical data can be limited to the past year or past few months of search history, with both frequency and recency as a weighting factor for the recommendation algorithm.

As part of the user history 315-3, user data collected from the ridesharing app may include the user's past destinations, ratings, and frequency of inputted activities of interest, as well as the user's historical feedback. This user history 315-3 data may provide an improved sense of the user's preferences, personality, or lifestyle in general by tracking the user history and their tendency to do certain activities or go to certain locations. For example, if the user has gone to a Mexican restaurant many times in the past few weeks, the routing recommendation system 300 may favor (or rank) a Mexican restaurant higher (than non-Mexican restaurants) when an eating activity is requested. The user's historical feedback on the routing recommendations, if any, can be considered as part of the user history 315-3 when making future routing recommendations as well.

In some embodiments, as part of the user history 315-3, user data may also be collected from the sensors of the AV. For example, camera data of past trips of the user can be utilized for user data. In this example, the camera data may indicate certain preferences of activities or styles of the user. In particular, cameras of the AV may capture the user holding products from particular business (e.g., branded items and bags) and/or types of products (e.g., coffee cups, cycling equipment, etc.). This data can be used by the routing recommendation system 300 as part of suggesting locations for activities and/or ranking certain activity locations higher than others.

The other users' history 315-4 may refer to historical data of other users of the AV ride-hailing service. Other users' data may be collected similar to as described with respect to user history 315-3. This other users' history 315-4 data may be used to improve the personalization of the routing recommendations provided by the routing recommendation system 300. For example, the user may also like a place that those who share similar demographics and/or preference of meals with the user have gone to and given high ratings in the past. This other users' history 315-4 data can enable the routing recommendation system 300 to provide activity recommendations that enable the user to explore new places they have not previously visited.

In some embodiments, data from AV sensors, such as AV cameras, can be utilized to aid in the activity recommendations. For example, long lines at a particular business might indicate that the business is popular and would motivate the system to recommend this business over others. Furthermore, people holding a particular coffee cup while at another business might indicate that it is popular to go to business A (e.g., coffee shop) before going to business B (e.g., a movie theatre). This can extend to other non-user passengers of AV (e.g., what passengers are wearing or holding would impact what is recommended).

Using the data collected at data collection 310, the routing recommendation system 300 may then proceed to routing recommendation generation 320. In one embodiment, routing recommendation generation 320 includes NLP-based text classification 325-1, mapping locations of interest 325-2, ranking locations 325-3, collaborative filtering 325-4, and K-means clustering 325-5 to identify optimal locations.

NLP-based classification 325-1 may translate the user inputs 315-1 of the list of activities and point of destination into specific location types that are understandable in a computing language and/or indexable in a map database. In one embodiment, a trained ML model (e.g., provided by AI/ML platform 130 of FIG. 1) may be utilized to perform the NLP-based classification. In one example, the NLP-based classification may translate the following human free text form of activities to the corresponding classified activity types: "lunch" is translated to "café" or "restaurant"; "mani-pedi" is translated to "nail salon"; "meet a friend at a café" is translated to "café".

Once a breakdown of the classified location types based on user activities is determined by NLP-based classification 325-1, the routing recommendation generation 320 proceeds to mapping locations of interest 325-2. Mapping locations of interest 325-2 may include two steps. First, locations are searched based on the user inputs 315-1. This includes, for each classified location type (e.g., restaurant, nail salon, café, beauty salon, etc.), searching for all locations in a geographic boundary of the specified point of destination. For example, all nail salons in the neighborhood of "ABC Valley" can be identified. In one embodiment, a locations dataset (e.g., location dataset 119 of FIG. 1) may be utilized to search for locations.

Second, the returned locations for each activity can be filtered using the additional (optional) user inputs 315-1, such as the rating and reviews. For example, if the user selects a rating=4 and reviews=100, then the locations selected can be narrowed down to those with at least 4 stars of rating and 100 customer reviews. In one embodiment, the routing recommendation system may set a default of "3" for ratings, and "0" for number of reviews if the user does not provide any input for ratings or reviews.

In one example, the NLP-based text classification 325-1 may identify the following example classified location types for a user's list of activities: a cafe, a restaurant, and a beauty salon. In turn, the mapping of locations of interest 325-2 may provide the following example output of the mapped locations after applying the user input-based filters of ratings and reviews: Cafes in ABC Valley: Café_1, Café_2, Café_3, etc.; Restaurants in ABC Valley: Restaurant_1, Restaurant_2, Restaurant_3, etc.; and Beauty salons in ABC Valley: Beauty Salon_1, Beauty Salon_2, Beauty Salon_3, etc.

The filtered list of activities that were mapped at mapping locations of interest 325-2, are then processed at ranking locations 325-3. For ranking locations 325-3, the filtered list of activities is ranked using a ranking technique, such as Content Filtering. This ranking technique provides an ordered list of locations that is based on user preferences and data. For example, the ranking technique can utilize the user inputs 315-1, user profile 315-2, and/or user history 315-3 as part of the ranking processor.

In one example, the user input 315-1 may include an activity of "lunch" in the point of destination of "ABC Valley". The user history 315-3 can allow for ranking locations for lunch based on the user's previous activity. For example, if the user visited a Mexican restaurant four times in the past two weeks, then any Mexican restaurants identified in the filtered list of activities may be ranked higher than non-Mexican restaurants. Furthermore, the user profile 315-2 can include meal preferences that enable further ranking of the restaurants identified for the "lunch" activity. For example, if the user profile 315-2 identifies a meal preference of "tacos", then those restaurants in the filtered list of activities that serve tacos may be ranked higher than other restaurants in the filtered list of activities that do not serve tacos.

The ranked list of activities from ranking locations 325-3 is then processed at collaborative filtering 325-4. In one embodiment, collaborative filtering 325-4 can utilize other users' history 315-4 to provide additional filtering to the ranked list of activities. For example, collaborative filtering 325-4 may utilize the ratings and/or reviews of other users of the AV ride-hailing service that are similar to the user in order to make recommendations of places that the user might like. In one embodiment, a trained ML model (e.g., provided by AI/ML platform 130 of FIG. 1) may be utilized to perform the collaborative filtering 325-4.

In one embodiment, the collaborative filtering 325-4 may first compute similarity scores across users, and then select the top M users having the closest distance to the user. Then, the collaborative filtering 325-4 can identify locations from the selected other users' history 315-4 that satisfy the user's preferences. Locations that have not yet been visited by the user may be selected in addition to the ranked list of activities to recommend to the user.

In one example, the user may share high similarity scores to other users who have been to Mexican restaurants as well. It is observed that these users also tend to go to Peruvian restaurants. In this case, there are two ways the collaborative filtering 325-4 of recommending similar places would be useful for the user. First, when the user's choice of food is not available in the area (point of destination) that the user identified, the routing recommendation system 300 can then recommend other restaurants that the user might still enjoy. Second, the collaborative filtering 325-4 can provide exposure to the user of food and/or places that the user may enjoy as an extension of available options.

The collaboratively-filtered and ranked list of locations are then provided to K-means clustering 325-5 to identify optimal locations. K-means clustering 325-5 refers to an unsupervised ML algorithm that groups similar data points together and discovers underlying patterns. K-means looks for a fixed number (K) of clusters in a dataset. In one embodiment, a trained ML model (e.g., provided by AI/ML platform 130 of FIG. 1) may be utilized to perform the K-means clustering. In embodiments herein, K-means clustering 325-5 can optimize K by closest distance to respective centroids. The average number of reviews and ratings are computed for each centroid to rank the sets of recommendable places based on the user's activities of interest.

In one example, the K-means clustering 325-5 may generate two sets of recommendations, which are ascendingly ordered by higher number of reviews and ratings of the places. A first set of recommendations may identify intersection_1 as a centroid (drop-off location) of the following locations for requested activities: location_1 for lunch, location_2 for a mani-pedi, and location_3 for a café to meet a friend. A second set of recommendations may identify intersection_2 as a centroid of the following locations for requested activities: location_4 for lunch, location_5 for a mani-pedi, and location_6 for a café to meet a friend.

In some embodiments, the "ratings" or "saved" feature from previous trips of the user can be utilized as an additional input, if available, to rank the recommended drop-off locations (centroids). In one embodiment, if the "Ordered activities" indicator is set (e.g., toggle is on, box is checked, etc.), the drop-off location is set as location_1 or location_4, respectively, for the example two sets of recommendations above.

In one embodiment, the set of recommendations having the highest average ratings and/or reviews is selected to recommend to the user as recommendation 330. The user may then be prompted to confirm the selected set of recommendations at user confirmation 340. If the user prefers to see other options, then the user can select an option to review other recommendations and the user can then be shown the second set of recommendations on the list, and so on. In some embodiments, the user can continue to have the option to return to the previous sets of recommendations for selection.

In some embodiments, pick-up options and additional recommendations 350 may provide pick-up options for the user as well as recommendations of additional activities that are available at or near the confirmed locations. The pick-up options may include an option to set the drop-off time (e.g., now or a later time), for example. The additional activities may be identified based on the data 315-1 through 315-4 of data collection 310. For example, if the location_2 for the mani-pedi is selected and at that location hair services are also offered, the pick-up options 350 may identify such additional services to the user as an option. Furthermore, in some embodiments, other locations may have high ratings and/or reviews from other users of the AV ride-hailing service with a high similarity score to the user. These other locations may be presented to the user as part of pick-up options and additional recommendations 350 in order to make recommendations of additional places that the user may like to visit. The user can select one or more of these additional activities to add to the itinerary.

Once the pick-up options and any additional recommendations 350 are selected, the routing recommendation system may then generate an itinerary confirmation 360 for the user. The itinerary confirmation 360 may identify the drop-off location as well as the locations for each of the user's list of activities. Information regarding the AV that is dispatched for the user may also be provided and the estimated time of arrival of the AV. If any additional recommended places of activities are selected by the user, these locations may also be presented to the user in the itinerary confirmation 360.

In one embodiment, once the trip is completed, the user may be prompted with a feedback page to provide user feedback 370. User feedback 370 may include a rating and review of the user's experience with the particular routing recommendation. In one embodiment, the feedback data can be used to improve the personalization of rankings and recommendations for the next locations.

FIG. 4 illustrates an example method 400 implementing generating a routing recommendation based on user activities, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where input data is received from a user of an AV ride-hailing service. In one embodiment, the input data includes a list of activities requested by the user and a point of destination requested by the user. At block 420, locations of interest corresponding to the list of activities are mapped. In one embodiment, the locations of interest are within a geographic boundary of the point of destination indicated by the user.

Subsequently, at block 430, an ordered list of the locations of interest is generated based on a profile of the user established with the AV ride-hailing service and based on historical data of the user with the AV ride-hailing service. Then, at block 440, the ordered list of the locations of interest is supplemented based on other historical data of other users of the AV ride-hailing service.

At block 450, K-means clustering is applied to the recommended list of places to identify one or more sets of recommendations and to identify a centroid location for each set of recommendations. Lastly, at block 460, a routing recommendation is provided to the user via an application of the AV ride-hailing service. In one embodiment, the routing recommendation corresponds to a selected set of the sets of recommendations.

FIG. 5 illustrates an example method 500 for implementing an overall process of a routing recommendation system based on user activities, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where input data is received from a user of an AV ride-hailing service. In one embodiment, the input data includes a list of activities requested by the user and a point of destination requested by the user. Then, at block 520, a routing recommendation is provided to the user via an application of the AV ride-hailing service. In one embodiment, the routing recommendation includes a location for each activity in the list of activities and a drop off location. The routing recommendation can be generated based on the input data, a profile of the user established for the AV ride-hailing service, historical data of the user with the AV ride-hailing service, and other historical data of other users with the AV ride-hailing service.

Subsequently, at block 530, user confirmation of the routing recommendation is received via the application of the AV ride-hailing service. At block 540, an activity recommendations of other activities are provided to the user. In one embodiment, the activity recommendations of the other activities includes activities that are available in a geographic boundary of the point of destination.

Then, at block 550, an itinerary confirmation is provided to the user via the application. In one embodiment, the itinerary confirmation includes a confirmation of the routing recommendation and any other activity recommendations selected by the user. Lastly, a block 560, user feedback is received with respect to the routing recommendation. In one embodiment, the user feedback is utilized to improve future routing recommendations for the user, as well as for other users of the AV ride-hailing service.

Further to the descriptions above, a user may be provided with controls allowing the user to make an election as to both if and when systems, programs, or features described herein may enable collection of user information (e.g., information about a user's preferences, actions or activities, user's location, user's profession, user's biographical information, etc.), and if the user is to be sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to city, ZIP code, or state level), so that a particular location of a user cannot be determined. Thus, the user may have control over what information is collected about the user, how that information is used, and what information is provided to the user.

Figure 6:
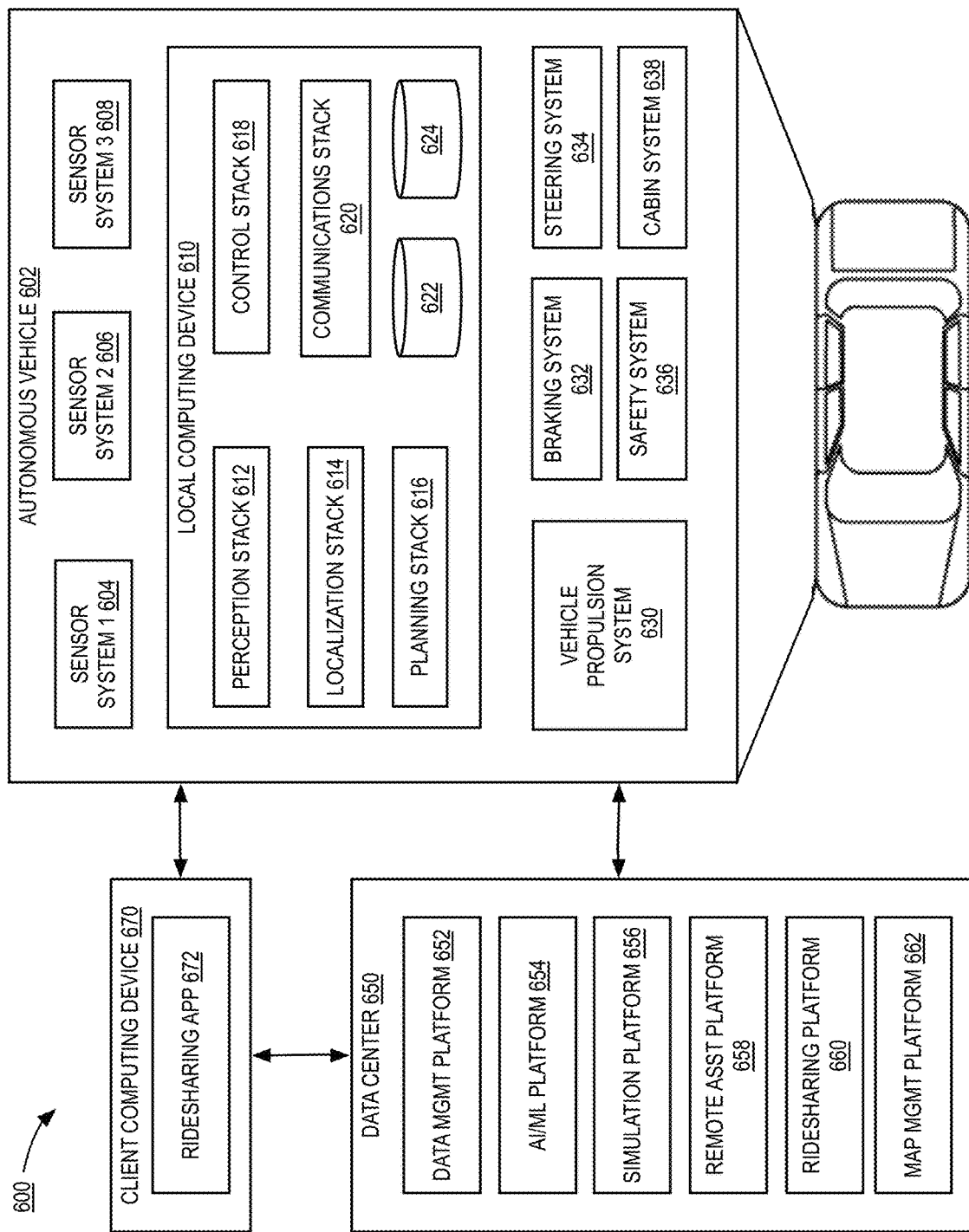
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. In one embodiment, the AV management system 600 can implement a routing recommendation system based on user activities, as described further herein. One of ordinary skill in the art will understand that, for the AV management system 600 and any system discussed in the disclosure, there can be additional or fewer components in similar or alternative configurations. The illustrations and examples provided in the disclosure are for conciseness and clarity. Other embodiments may include different numbers and/or types of elements, but one of ordinary skill the art will appreciate that such variations do not depart from the scope of the disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 7 and elsewhere in the disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.)

obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart car pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
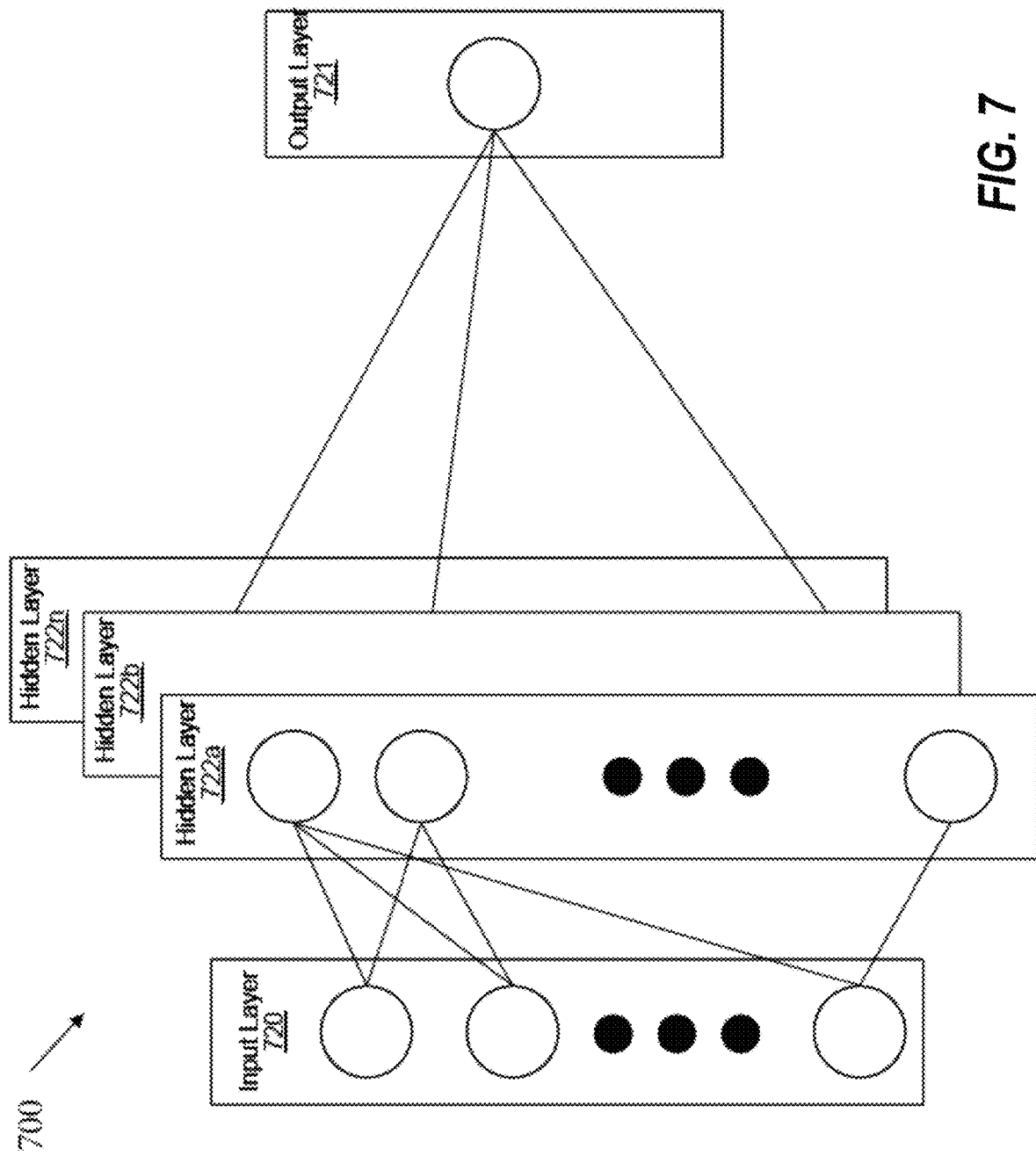
FIG. 7 illustrates an example of a deep learning neural network that can be used to implement a perception module and/or one or more validation modules, according to some aspects of the disclosed technology.

In FIG. 7, the disclosure now turns to a further discussion of models that can be used through the environments and techniques described herein. Specifically, FIG. 7 is an illustrative example of a deep learning neural network 700 that can be used to implement all or a portion of a perception module (or perception system) as discussed above. An input layer 720 can be configured to receive sensor data and/or data relating to an environment surrounding an AV. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include many layers for the given application. The neural network 700 further includes an output layer 721 that provides an output resulting from the processing performed by the hidden layers 722a, 722b, through 722n. In one illustrative example, the output layer 721 can provide estimated treatment parameters that can be used/ingested by a differential simulator to estimate a patient treatment outcome.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722*a*. 722*b*, through 722*n* in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze errors in the output. Any suitable loss function definition can be used, such as a Cross-Entropy loss. Another example of a loss function includes the mean squared error (MSE), defined as $E\_total=\Sigma(½target-output)^2$). The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for down sampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
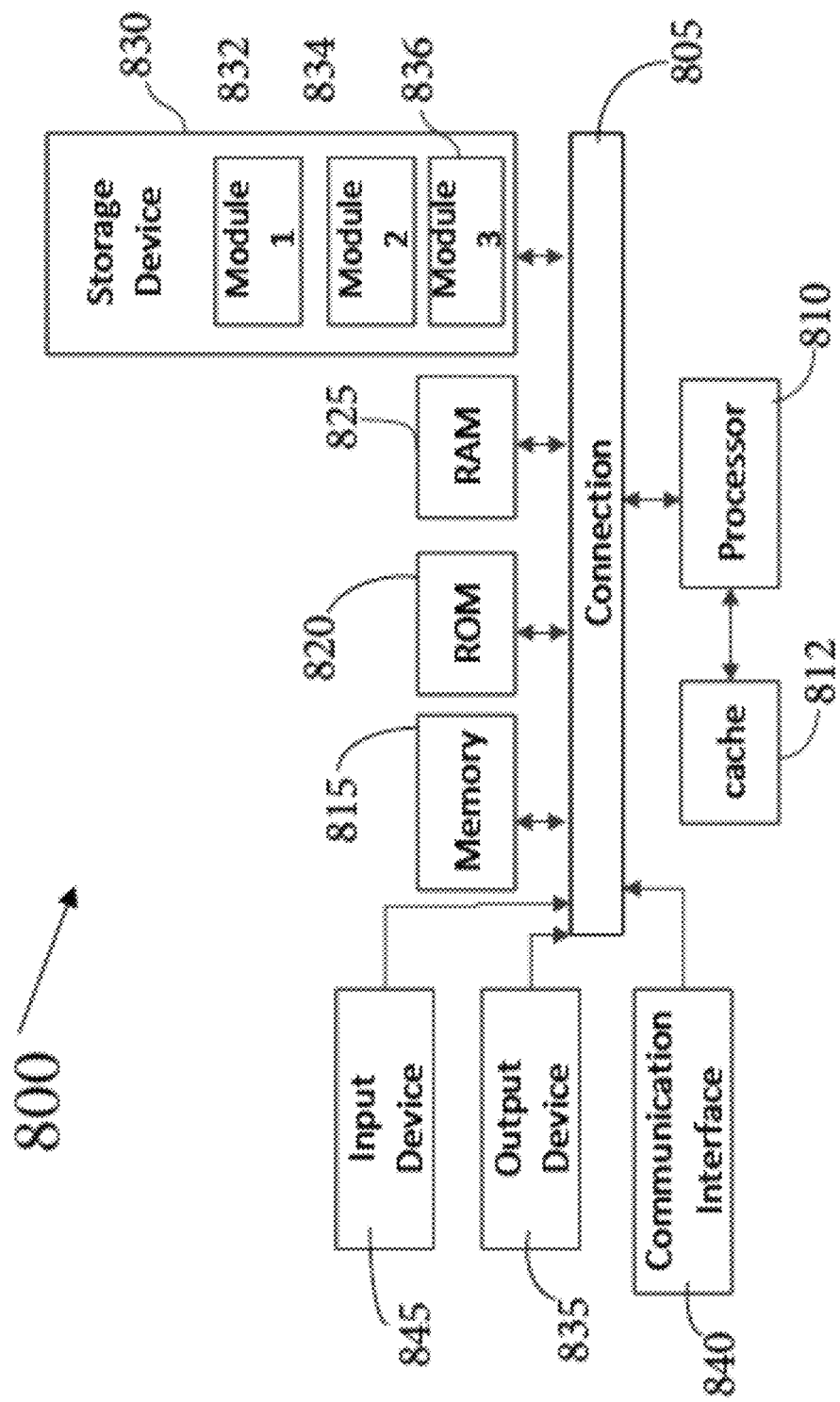
FIG. 8 illustrates an example processor-based system with which some aspects of the subject technology can be implemented.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with hardware components, such as processor 810, connection 805, output device 835, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 includes a method for facilitating a routing recommendation system based on user activities, where the method comprises receiving, by a processing device of a server providing an autonomous vehicle (AV) ride-hailing service, input data comprising a list of activities requested by a user of the AV ride-hailing service and a point of destination requested by the user; mapping, by the processing device, locations of interest corresponding to the list of activities, wherein the locations of interest are within a geographic boundary of the point of destination; generating an ordered list of the locations of interest based on a user profile of the user established with the AV ride-hailing service and historical data of the user with the AV ride-hailing service; supplementing the ordered list of the locations of interest based on other historical data of other users of the AV ride-hailing service, the supplementing to generate a recommended list of places; applying a K-means clustering technique to the recommended list of places to identify one or more sets of recommendations and to identify a centroid location for each set of recommendations; and providing, to the user via an application of the AV ride-hailing service, a routing recommendation corresponding to a selected set of the one or more sets of recommendations.

In Example 2, the subject matter of Example 1 can optionally include wherein mapping the locations of interest further comprising: applying a natural language processing (NLP) machine learning (ML) algorithm to translate the list of activities into a classified form of location types; and searching one or more location databases using the classified form of location types to identify the locations of interests within the geographic boundary. In Example 3, the subject matter of any one of Examples 1-2 can optionally include further comprising filtering the locations of interest using one or more of a rating threshold or a review threshold indicated by the user as part of the input data. In Example 4, the subject matter of any one of Examples 1-3 can optionally include wherein the user profile established with the AV ride-hailing service comprises at least one of an address of the user, an age of the user, a gender of the user, favorite locations of the user, or meal restrictions of the user.

In Example 5, the subject matter of any one of Examples 1-4 can optionally include wherein the routing recommendation comprising a location for each activity of the list of activities and a drop-off location comprising the centroid location for the selected set. In Example 6, the subject matter of any one of Examples 1-5 can optionally include wherein generating the ordered list further comprises ranking the locations of interest using a content filtering technique, the ranking based on the input data, the user profile, and the historical data of the user.

In Example 7, the subject matter of any one of Examples 1-6 can optionally include wherein supplementing the ordered list further comprises: selecting sets of other users comprising a determined number of the other users having a similarity score with a closest distance to the user; and adding additional locations to the ordered list, wherein the additional locations are sourced from the other historical data of the set of other users, and wherein the additional locations have not been visited by the user and satisfy preferences of the user from the user profile.

In Example 8, the subject matter of any one of Examples 1-7 can optionally include wherein applying the K-means clustering technique further comprises: generating the one or more sets of recommendations by optimizing K using a machine-learning (ML) algorithm, wherein K is optimized by a closest distance to respective centroid locations of each set of recommendations; computing an average number of reviews and ratings for each set of recommendations; and ranking the one or more sets of recommendations in ascending order based on the average number of reviews and ratings for each set of recommendations. In Example 9, the subject matter of any one of Examples 1-8 can optionally include wherein the historical data of the user and the other historical data of other users of the AV ride-hailing service comprises application data obtained from the application and sensor data obtained from one or more sensors of AVs utilized by the user and the other users as part of the AV ride-hailing service.

In Example 10, the subject matter of any one of Examples 1-9 can optionally include wherein responsive to an ordered activity toggle being indicated as set by the user, providing a first location corresponding to a first activity in the list of activities as a drop-off location in the routing recommendation. In Example 11, the subject matter of any one of Examples 1-10 can optionally include further comprising: receiving user confirmation of the routing recommendation; providing, to the user via the application of the AV ride-hailing service, activity recommendations of other activities that are available in the geographic boundary of the point of destination; providing, to the user via the application, an itinerary confirmation confirming the routing recommendation and any other activity recommendations selected by the user; and receiving user feedback with respect to the routing recommendation, wherein the user feedback is utilized by the AV ride-hailing service to improve future routing recommendations.

Example 12 includes an apparatus for facilitating a routing recommendation system based on user activities, the apparatus of Example 12 comprising one or more hardware processors of a server of an autonomous vehicle (AV) ride-hailing service, the one or more hardware processors to: receive input data comprising a list of activities requested by a user of the AV ride-hailing service and a point of destination requested by the user; map locations of interest corresponding to the list of activities, wherein the locations of interest are within a geographic boundary of the point of destination; generate an ordered list of the locations of interest based on a user profile of the user established with the AV ride-hailing service and historical data of the user with the AV ride-hailing service; supplement the ordered list of the locations of interest based on other historical data of other users of the AV ride-hailing service, the supplementing to generate a recommended list of places; apply a K-means clustering technique to the recommended list of places to identify one or more sets of recommendations and to identify a centroid location for each set of recommendations; and provide, to the user via an application of the AV ride-hailing service, a routing recommendation corresponding to a selected set of the one or more sets of recommendations.

In Example 13, the subject matter of Example 12 can optionally include wherein mapping the locations of interest further comprising: applying a natural language processing (NLP) machine learning (ML) algorithm to translate the list of activities into a classified form of location types; searching one or more location databases using the classified form of location types to identify the locations of interests within the geographic boundary; and filtering the locations of interest using one or more of rating threshold or a review threshold indicated by the user as part of the input data. In Example 14, the subject matter of Examples 12-13 can optionally include wherein the routing recommendation comprising a location for each activity of the list of activities and a drop-off location comprising the centroid location for the selected set.

In Example 15, the subject matter of Examples 12-14 can optionally include wherein the one or more hardware processors to generate the ordered list further comprises the one or more hardware processors to rank the locations of interest using a content filtering technique, the ranking based on the input data, the user profile, and the historical data of the user. In Example 16, the subject matter of Examples 12-15 can optionally include wherein the one or more hardware processors to supplement the ordered list further comprises the one or more hardware processors to: select set of other users comprising a determined number of the other users having a similarity score with a closest distance to the user; and add additional locations to the ordered list, wherein the additional locations sourced from the other historical data of the set of other users, and wherein the additional locations have not been visited by the user and satisfy preferences of the user from the user profile.

In Example 17, the subject matter of Examples 12-16 can optionally include wherein the one or more hardware processors to apply the K-means clustering technique further comprises the one or more hardware processors to: generate the one or more sets of recommendations by optimizing K, wherein K is optimized by a closest distance to respective centroid locations of each set of recommendations; compute an average number of reviews and ratings for each set of recommendations; and rank the one or more sets of recommendations in ascending order based on the average number of reviews and ratings for each set of recommendations.

Example 18 is a non-transitory computer-readable storage medium for facilitating a routing recommendation system based on user activities. The non-transitory computer-readable storage medium of Example 18 having stored thereon executable computer program instructions that, when executed by one or more processors, cause the one or more processors to: receive, by the one or more processors of a server providing an autonomous vehicle (AV) ride-hailing service, input data comprising a list of activities requested by a user of the AV ride-hailing service and a point of destination requested by the user; map, by the one or more processors, locations of interest corresponding to the list of activities, wherein the locations of interest are within a geographic boundary of the point of destination; generate an ordered list of the locations of interest based on a user profile of the user established with the AV ride-hailing service and historical data of the user with the AV ride-hailing service; supplement the ordered list of the locations of interest based on other historical data of other users of the AV ride-hailing service, the supplementing to generate a recommended list of places; apply a K-means clustering technique to the recommended list of places to identify one or more sets of recommendations and to identify a centroid location for each set of recommendations; and provide, to the user via an application of the AV ride-hailing service, a routing recommendation corresponding to a selected set of the one or more sets of recommendations.

In Example 19, the subject matter of Example 18 can optionally include wherein the one or more processors to map the locations of interest further comprises the one or more processors to: apply a natural language processing (NLP) machine learning (ML) algorithm to translate the list of activities into a classified form of location types; search one or more location databases using the classified form of location types to identify the locations of interests within the geographic boundary; and filter the locations of interest using one or more of rating threshold or a review threshold indicated by the user as part of the input data. In Example 20, the subject matter of Examples 18-19 can optionally include wherein the routing recommendation comprising a location for each activity of the list of activities and a drop-off location comprising the centroid location for the selected set.

Example 21 is a system for facilitating a routing recommendation system based on user activities. The system of Example 21 can optionally include a memory to store a block of data, and one or more hardware processors of a server of an autonomous vehicle (AV) ride-hailing service, the one or more hardware processors communicably coupled to the memory and are to: receive input data comprising a list of activities requested by a user of the AV ride-hailing service and a point of destination requested by the user; map locations of interest corresponding to the list of activities, wherein the locations of interest are within a geographic boundary of the point of destination; generate an ordered list of the locations of interest based on a user profile of the user established with the AV ride-hailing service and historical data of the user with the AV ride-hailing service; supplement the ordered list of the locations of interest based on other historical data of other users of the AV ride-hailing service, the supplementing to generate a recommended list of places; apply a K-means clustering technique to the recommended list of places to identify one or more sets of recommendations and to identify a centroid location for each set of recommendations; and provide, to the user via an application of the AV ride-hailing service, a routing recommendation corresponding to a selected set of the one or more sets of recommendations.

In Example 22, the subject matter of Example 21 can optionally include wherein mapping the locations of interest further comprising: applying a natural language processing (NLP) machine learning (ML) algorithm to translate the list of activities into a classified form of location types; searching one or more location databases using the classified form of location types to identify the locations of interests within the geographic boundary; and filtering the locations of interest using one or more of rating threshold or a review threshold indicated by the user as part of the input data. In Example 23, the subject matter of Examples 21-22 can optionally include wherein the routing recommendation comprising a location for each activity of the list of activities and a drop-off location comprising the centroid location for the selected set.

In Example 24, the subject matter of Examples 21-23 can optionally include wherein the one or more hardware processors to generate the ordered list further comprises the one or more hardware processors to rank the locations of interest using a content filtering technique, the ranking based on the input data, the user profile, and the historical data of the user. In Example 25, the subject matter of Examples 21-24 can optionally include wherein the one or more hardware processors to supplement the ordered list further comprises the one or more hardware processors to: select set of other users comprising a determined number of the other users having a similarity score with a closest distance to the user; and add additional locations to the ordered list, wherein the additional locations sourced from the other historical data of the set of other users, and wherein the additional locations have not been visited by the user and satisfy preferences of the user from the user profile.

In Example 26, the subject matter of Examples 21-25 can optionally include wherein the one or more hardware processors to apply the K-means clustering technique further comprises the one or more hardware processors to: generate the one or more sets of recommendations by optimizing K, wherein K is optimized by a closest distance to respective centroid locations of each set of recommendations; compute an average number of reviews and ratings for each set of recommendations; and rank the one or more sets of recommendations in ascending order based on the average number of reviews and ratings for each set of recommendations.

Example 27 includes an apparatus comprising means for performing the method of any of the Examples 1-11. Example 28 is at least one machine readable medium comprising a plurality of instructions that in response to being executed on a computing device, cause the computing device to carry out a method according to any one of Examples 1-11. Example 29 is an apparatus for facilitating a routing recommendation system based on user activities, configured to perform the method of any one of Examples 1-11. Specifics in the Examples may be used anywhere in one or more embodiments.

The various embodiments described above are provided by way of illustration and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:

receiving, by a processing device of a server providing an autonomous vehicle (AV) ride-hailing service, input data comprising a list of activities requested by a user of the AV ride-hailing service and a point of destination requested by the user, and remote real-time sensor data collected from sensors of one or more AVs;

mapping, by the processing device, locations of interest corresponding to the list of activities, wherein the locations of interest are within a geographic boundary of the point of destination;

evaluating the remote real-time sensor data to generate real-time information about the locations of interest;

generating an ordered list of the locations of interest based on a user profile of the user established with the AV ride-hailing service, and historical data of the user with the AV ride-hailing service;

supplementing the ordered list of the locations of interest based on other historical data of other users of the AV ride-hailing service, the supplementing and the real-time information to generate a recommended list of places;

applying a K-means clustering technique to the recommended list of places to identify one or more sets of recommendations and to identify a centroid location for each set of recommendations, wherein the K-means clustering technique comprises optimizing K using a machine-learning (ML) algorithm, wherein K is optimized by a closest distance to the respective centroid locations of each set of recommendations, computing an average number of reviews and ratings for each set of recommendations, and ranking the one or more sets of recommendations in ascending order based on the average number of reviews and ratings and the real-time information for each set of recommendations; and providing, to the user via an application of the AV ride-hailing service, a routing recommendation corresponding to a selected set of the one or more sets of recommendations;

receiving, by the processing device, an acceptance of the routing recommendation from the user via the application;

providing, by the processing device, the accepted routing recommendation and the remote real-time sensor data to a local computing device of an AV, the local computing device having a local memory, a local processor, and local instructions defining an AV software stack, wherein the local computing device is coupled to local sensors generating local sensor data and mechanical systems of the AV; and generating commands, by the local processor, to actuate the mechanical systems to move the AV according to the accepted routing recommendation;

during movement of the AV according to the accepted routing recommendation, combining, by the local processor, the local sensor data, the remote real-time sensor data, and the accepted routing recommendation to determine an action prioritized over following the accepted routing recommendation for the purposes of one or more of avoiding obstacles or obeying traffic rules or other safety standards or practices for the road;

generating commands, by the local processor, to actuate the mechanical systems to cause the AV to deviate from the accepted routing recommendation in order to perform the determined action, then continue to move according to the accepted routing recommendation; and sending reviews and ratings of the accepted routing recommendation and local sensor data, via at least one of the application and the local computing device, to the processing device of the server to further optimize K.

2. The method of claim 1, wherein mapping the locations of interest further comprises:

applying a natural language processing (NLP) machine learning (ML) algorithm to translate the list of activities into a classified form of location types; and searching one or more location databases using the classified form of location types to identify the locations of interests within the geographic boundary.

3. The method of claim 2, further comprising filtering the locations of interest using one or more of a rating threshold or a review threshold indicated by the user as part of the input data.

4. The method of claim 1, wherein the user profile established with the AV ride-hailing service comprises at least one of an address of the user, an age of the user, a gender of the user, favorite locations of the user, or meal restrictions of the user.

5. The method of claim 1, wherein the routing recommendation comprises a location for each activity of the list of activities and a drop-off location comprising the centroid location for the selected set.

6. The method of claim 1, wherein generating the ordered list further comprises ranking the locations of interest using a content filtering technique, the ranking based on the input data, the user profile, and the historical data of the user.

7. The method of claim 1, wherein supplementing the ordered list further comprises:

selecting sets of other users comprising a determined number of the other users having a similarity score with a closest distance to the user; and adding additional locations to the ordered list, wherein the additional locations are sourced from the other historical data of the set of other users, and wherein the additional locations have not been visited by the user and satisfy preferences of the user from the user profile.

8. The method of claim 1, wherein the historical data of the user comprises application data obtained from the application and sensor data obtained from one or more sensors of AVs utilized by the user; and wherein the other historical data of other users comprises other application data obtained from the application and other sensor data obtained from the one or more sensors of AVs utilized by the other users as part of the AV ride-hailing service.

9. The method of claim 1, wherein responsive to an ordered activity toggle being indicated as set by the user, providing a first location corresponding to a first activity in the list of activities as a drop-off location in the routing recommendation.

10. The method of claim 1, further comprising:

providing, to the user via the application of the AV ride-hailing service, activity recommendations of other activities that are available in the geographic boundary of the point of destination; and providing, to the user via the application, an itinerary confirmation confirming the routing recommendation and any other activity recommendations selected by the user.

11. An apparatus comprising:
one or more hardware processors of a server of an autonomous vehicle (AV) ride-hailing service, the one or more hardware processors configured to:
  receive input data comprising a list of activities requested by a user of the AV ride-hailing service and a point of destination requested by the user, and remote real-time sensor data collected from AV sensors of one or more AVs;
  map locations of interest corresponding to the list of activities, wherein the locations of interest are within a geographic boundary of the point of destination;
  evaluate the remote real-time sensor data to generate real-time information about the locations of interest;
  generate an ordered list of the locations of interest based on a user profile of the user established with the AV ride-hailing service and historical data of the user with the AV ride-hailing service;
  supplement the ordered list of the locations of interest based on other historical data of other users of the AV ride-hailing service and the real-time information to generate a recommended list of places;
  apply a K-means clustering technique to the recommended list of places to identify one or more sets of recommendations and to identify a centroid location for each set of recommendations, wherein the K-means clustering technique comprises optimizing K using a machine-learning (ML) algorithm, wherein K is optimized by a closest distance to the respective centroid locations of each set of recommendations, computing an average number of reviews and ratings for each set of recommendations, and ranking the one or more sets of recommendations in ascending order based on the average number of reviews and ratings and the real-time information for each set of recommendations; and
  provide, to the user via an application of the AV ride-hailing service, a routing recommendation corresponding to a selected set of the one or more sets of recommendations;
  receive, by the processing device, an acceptance of the routing recommendation from the user via the application;
  provide, by the processing device, the accepted routing recommendation and the remote real-time sensor data to a local computing device of an AV, the local computing device having a local memory, a local processor, and local instructions defining an AV software stack, wherein the local computing device is coupled to local sensors generating local sensor data and mechanical systems of the AV; and
  generate commands, by the local processor, to actuate the mechanical systems to move the AV according to the accepted routing recommendation;
  during movement of the AV according to the accepted routing recommendation, combine, by the local processor, the local sensor data, the remote real-time sensor data, and the accepted routing recommendation to determine an action prioritized over following the accepted routing recommendation for the purposes of one or more of avoiding obstacles or obeying traffic rules or other safety standards or practices for the road;
  generate commands, by the local processor, to actuate the mechanical systems to cause the AV to deviate from the accepted routing recommendation in order to perform the determined action, then continue to move according to the accepted routing recommendation; and
  send reviews and ratings of the accepted routing recommendation and local sensor data, via at least one of the application and the local computing device, to the processing device of the server to further optimize K.

12. The apparatus of claim 11, wherein mapping the locations of interest further comprises:
  applying a natural language processing (NLP) machine learning (ML) algorithm to translate the list of activities into a classified form of location types;
  searching one or more location databases using the classified form of location types to identify the locations of interests within the geographic boundary; and
  filtering the locations of interest using one or more of rating threshold or a review threshold indicated by the user as part of the input data.

13. The apparatus of claim 11, wherein the routing recommendation comprises a location for each activity of the list of activities and a drop-off location comprising the centroid location for the selected set.

14. The apparatus of claim 11, wherein the one or more hardware processors to generate the ordered list further comprises the one or more hardware processors to rank the locations of interest using a content filtering technique, the ranking based on the input data, the user profile, and the historical data of the user.

15. The apparatus of claim 11, wherein the one or more hardware processors to supplement the ordered list further comprises the one or more hardware processors to:
  select set of other users comprising a determined number of the other users having a similarity score with a closest distance to the user; and
  add additional locations to the ordered list, wherein the additional locations sourced from the other historical data of the set of other users, and wherein the additional locations have not been visited by the user and satisfy preferences of the user from the user profile.

16. A non-transitory computer-readable medium having stored thereon instructions that, when executed by one or more processors, cause the one or more processors to:
  receive, by the one or more processors of a server providing an autonomous vehicle (AV) ride-hailing service, input data comprising a list of activities requested by a user of the AV ride-hailing service and a point of destination requested by the user, and remote real-time sensor data collected from AV sensors of one or more AVs;
  map, by the one or more processors, locations of interest corresponding to the list of activities, wherein the locations of interest are within a geographic boundary of the point of destination;
  evaluate the remote real-time sensor data to generate real-time information about the locations of interest;
  generate an ordered list of the locations of interest based on a user profile of the user established with the AV ride-hailing service and historical data of the user with the AV ride-hailing service;
  supplement the ordered list of the locations of interest based on other historical data of other users of the AV ride-hailing service and the real-time information to generate a recommended list of places;
  apply a K-means clustering technique to the recommended list of places to identify one or more sets of recommendations and to identify a centroid location for each set of recommendations, wherein the K-means clustering technique comprises optimizing K using a machine-learning (ML) algorithm, wherein K is optimized by a closest distance to the respective centroid locations of each set of recommendations, computing an average number of reviews and ratings for each set of recommendations, and ranking the one or more sets of recommendations in ascending order based on the average number of reviews and ratings and the real-time information for each set of recommendations; and provide, to the user via an application of the AV ride-hailing service, a routing recommendation corresponding to a selected set of the one or more sets of recommendations;

receive, by the processing device, an acceptance of the routing recommendation from the user via the application;

provide, by the processing device, the accepted routing recommendation and the remote real-time sensor data to a local computing device of an AV, the local computing device having a local memory, a local processor, and local instructions defining an AV software stack, wherein the local computing device is coupled to local sensors generating local sensor data and mechanical systems of the AV; and generate commands, by the local processor, to actuate the mechanical systems to move the AV according to the accepted routing recommendation;

during movement of the AV according to the accepted routing recommendation, combine, by the local processor, the local sensor data, the remote real-time sensor data, and the accepted routing recommendation to determine an action prioritized over following the accepted routing recommendation for the purposes of one or more of avoiding obstacles or obeying traffic rules or other safety standards or practices for the road;

generate commands, by the local processor, to actuate the mechanical systems to cause the AV to deviate from the accepted routing recommendation in order to perform the determined action, then continue to move according to the accepted routing recommendation; and send reviews and ratings of the accepted routing recommendation and the local sensor data, via at least one of the application and the local computing device, to the processing device of the server to further optimize K.

17. The non-transitory computer-readable medium of claim 16, wherein the one or more processors to map the locations of interest further comprises the one or more processors to:

apply a natural language processing (NLP) machine learning (ML) algorithm to translate the list of activities into a classified form of location types;

search one or more location databases using the classified form of location types to identify the locations of interests within the geographic boundary; and filter the locations of interest using one or more of rating threshold or a review threshold indicated by the user as part of the input data.

18. The non-transitory computer-readable medium of claim 16, wherein the routing recommendation comprises a location for each activity of the list of activities and a drop-off location comprising the centroid location for the selected set.

* * * * *